(12) United States Patent
Alaluf et al.

(10) Patent No.: US 7,493,605 B2
(45) Date of Patent: Feb. 17, 2009

(54) METHOD AND A SOFTWARE PRODUCT FOR ADAPTING A .NET FRAMEWORK COMPLIANT REFLECTION MECHANISM TO A JAVA ENVIRONMENT

(75) Inventors: Eyal Alaluf, Jerusalem (IL); Ilya Kharmatsky, Jerusalem (IL)

(73) Assignee: Mainsoft R&D Ltd, Lod (IL)

( * ) Notice: Subject to any disclaimer, the term of this patent is extended or adjusted under 35 U.S.C. 154(b) by 609 days.

(21) Appl. No.: 11/023,607

(22) Filed: Dec. 29, 2004

(65) Prior Publication Data
US 2006/0143597 A1 Jun. 29, 2006

(51) Int. Cl.
G06F 9/44 (2006.01)
G06F 3/00 (2006.01)

(52) U.S. Cl. .............. 717/148; 717/136; 717/138; 717/139; 719/313; 719/330

(58) Field of Classification Search ............. 717/148, 717/136–161; 719/313, 330
See application file for complete search history.

(56) References Cited

U.S. PATENT DOCUMENTS

| | | | | |
|---|---|---|---|---|
| 7,120,898 | B2 * | 10/2006 | Grover et al. ............. | 717/114 |
| 7,162,710 | B1 * | 1/2007 | Edwards et al. ........... | 717/111 |
| 7,213,236 | B2 * | 5/2007 | Gibbons .................. | 717/136 |
| 2003/0023958 | A1 * | 1/2003 | Patel et al. .............. | 717/146 |
| 2004/0083467 | A1 * | 4/2004 | Hanley et al. ............ | 717/148 |
| 2004/0268301 | A1 * | 12/2004 | Kaston .................. | 717/108 |
| 2005/0097525 | A1 * | 5/2005 | Stone et al. ............. | 717/136 |
| 2005/0193369 | A1 * | 9/2005 | Brumme et al. ........... | 717/106 |
| 2005/0246695 | A1 * | 11/2005 | Wang .................... | 717/148 |
| 2006/0059474 | A1 * | 3/2006 | Bhansali et al. .......... | 717/151 |
| 2006/0101395 | A1 * | 5/2006 | Lopez et al. ............. | 717/111 |
| 2006/0225053 | A1 * | 10/2006 | Lakshman et al. ........ | 717/140 |

OTHER PUBLICATIONS

Heterogeneous Adaptive Component-Based Applications with Adaptive.Net, Andreas Rasche, Marco Puhlmann and Andreas Polze, IEEE, Proceedings of the Eighth IEEE International Symposium on Object-Oriented Real-Time Distributed Computing 2005, pp. 1-8.*

(Continued)

Primary Examiner—Wei Y. Zhen
Assistant Examiner—Satish S Rampuria
(74) Attorney, Agent, or Firm—Myers Wolin, LLC

(57) ABSTRACT

A method for adapting a .Net framework compliant reflection mechanism to a Java™ environment, wherein the reflection mechanism allows a user to discover class information and invoke data members solely at runtime. The method includes gathering reflection related metadata from a .Net assembly class of a respective .Net class that comprises the metadata. The method also includes the steps of generating an attributes class comprising at least the reflection related metadata and a plurality of conversion methods and integrating the attributes class in a Java™ class file of the respective .Net class, such that the reflection mechanism is capable of adapting the reflection mechanism as defined in the .Net framework to the Java™ environment. Also disclosed is a plurality of conversion methods. The attributes class is included in a Java™ class file rendered by a compiler capable of compiling a .Net class to a Java™ compliant programming code.

24 Claims, 10 Drawing Sheets

OTHER PUBLICATIONS

How .NET's custom attributes affect design, Newkirk, J.; Vorontsov, A.A.; Software, IEEE, vol. 19, Issue 5, Sep. - Oct. 2002 pp. 18-20.*

ILJc: Porting Microsoft.NET IL (Intermediate Language) to Java, Siddique, S.; Sheriff, S.D.; Wijesuriya, H.; Wickramaratne, C.; Makalanda, J.Industrial and Information Systems, First International Conference on Aug. 8-11, 2006, IEEE, pp. 119-121.*

Schult, W. Polze, A., Aspect-oriented programming with C# and .NET, IEEE, 2002,On pp. 241-248.*

Lutz, M.H. Laplante, P.A., C# and the .NET framework: ready for real time?, IEEE, 2003, vol. 20 , Issue: 1, On pp. 74-80.*

Neable, C., The .NET Compact Framework, IEEE, vol. 1 Issue: 4 Oct.-Dec. 2002, pp. 84-87.*

Wasson, G.; Beekwilder, N.; Morgan, M.; Humphrey, M., OGSI.NET: OGSI-compliance on the .NET framework, IEEE, 2004, pp. 648-655.*

* cited by examiner

```
1000  using System;
1001
1002  namespace VMWDemo
1003  {
1004
1005       public class TestClass
1006       {
1007            private int _intField;
1008
1009            public int IntFieldProperty
1010            {
1011                 get
1012                 {
1013                      return _intField;
1014                 }
1015                 set
1016                 {
1017                      _intField = value;
1018                 }
1019            }
1020
1021
1022            public TestClass(int i)
1023            {
1024                 _intField = i;
1025            }
1026
1027            public TestClass() : this (0)
1028            {
1029            }
1030
1031            public virtual int GetIntField()
1032            {
1033                 return _intField;
1034            }
1035
1036            public static void PrintIntField(TestClass tc)
1037            {
1038                 Console.WriteLine(tc.IntFieldProperty);
1039            }
1040
1041            public static void Main()
1042            {
1043                 TestClass tc = new TestClass(3);
1044                 TestClass.PrintIntField(tc);
1045                 tc.IntFieldProperty = 9;
1046                 TestClass.PrintIntField(tc);
1047
1048
1049
1050  }
1051
```

Fig. 2a

```
2000    public static class TestClassAttrib extends TypeInfo
2001        implements Cloneable
2002    {
2003       public void createMethodData()
2004       {
2005          ParameterInfo aparameterinfo[] = null;
2006          ParameterInfo aparameterinfo1[] = null;
2007          ParameterInfo aparameterinfo2[] = null;
2008          ParameterInfo aparameterinfo3[] = null;
2009          ParameterInfo aparameterinfo4[] = null;
2010          aparameterinfo = new ParameterInfo[1];
2011          aparameterinfo[0] = TypeInfo.createParameterInfo(null, "System.Int32", 0, 0);
2012          addMethodData("get_IntFieldProperty", null, 2182, 0, null, null, aparameterinfo);
2013          aparameterinfo1 = new ParameterInfo[2];
2014          aparameterinfo1[1] = TypeInfo.createParameterInfo("value", "System.Int32", 1, 0);
2015          addMethodData("set_IntFieldProperty", null, 2182, 0, null, null, aparameterinfo1);
2016          aparameterinfo2 = new ParameterInfo[1];
2017          aparameterinfo2[0] = TypeInfo.createParameterInfo(null, "System.Int32", 0, 0);
2018          addMethodData("GetIntField", null, 454, 0, null, null, aparameterinfo2);
2019          aparameterinfo3 = new ParameterInfo[2];
2020          aparameterinfo3[1] = TypeInfo.createParameterInfo("tc", "VMWDemo.TestClass", 1, 0);
2021          addMethodData("PrintIntField", null, 150, 0, null, null, aparameterinfo3);
2022          addMethodData("Main", "$Main$", 150, 0, null, null, aparameterinfo4 = new ParameterInfo[1]);
2023       }
2024
2025       public void createConstructorData()
2026       {
2027          ParameterInfo aparameterinfo[] = null;
2028          ParameterInfo aparameterinfo1[] = null;
2029          aparameterinfo = new ParameterInfo[2];
2030          aparameterinfo[1] = TypeInfo.createParameterInfo("i", "System.Int32", 1, 0);
2031          addConstructorData(".ctor", 6278, 0, null, null, aparameterinfo);
2032          addConstructorData(".ctor", 6278, 0, null, null, aparameterinfo1 = new ParameterInfo[1]);
2033       }
2034
2035       public void createPropertyData()
2036       {
2037          addPropertyData("IntFieldProperty", "System.Int32", 0, "get_IntFieldProperty", "set_IntFieldProperty",
2038   null, null);
2039       }
2040       public void createEventData() { }
2041       public void createFieldData()
2042       {
2043          addFieldData("_intField", "System.Int32", 1, null);
2044       }
2045       public void createTypeData()
2046       {
2047          addTypeData("VMWDemo.TestClass", "VMWDemo", 0x100001, null);
2048       }
2049
2050       public static final TestClassAttrib _INSTANCE = new TestClassAttrib();
2051       public TestClassAttrib()   { }
2052    }
2053
2054                          Fig. 2b
```

```
2055
3000     package VMWDemo;
3001
3002     import clr.compiler.ITypeableImplementable;
3003     import clr.compiler.TypeInfo;
3004     import system.*;
3005     import system.Reflection.ParameterInfo;
3006     import system.Type;
3007
3008     public class TestClass extends system.Object
3009         implements Cloneable, ITypeableImplementable
3010     {
3011         public static class TestClassAttrib extends TypeInfo
3012             implements Cloneable
3013         {
3014
3015         public void createMethodData()
3016         {
3017             ParameterInfo aparameterinfo[] = null;
3018             ParameterInfo aparameterinfo1[] = null;
3019             ParameterInfo aparameterinfo2[] = null;
3020             ParameterInfo aparameterinfo3[] = null;
3021             ParameterInfo aparameterinfo4[] = null;
3022             aparameterinfo = new ParameterInfo[1];
3023             aparameterinfo[0] = TypeInfo.createParameterInfo(null, "System.Int32", 0, 0);
3024             addMethodData("get_IntFieldProperty", null, 2182, 0, null, null, aparameterinfo);
3025             aparameterinfo1 = new ParameterInfo[2];
3026             aparameterinfo1[1] = TypeInfo.createParameterInfo("value", "System.Int32", 1, 0);
3027             addMethodData("set_IntFieldProperty", null, 2182, 0, null, null, aparameterinfo1);
3028             aparameterinfo2 = new ParameterInfo[1];
3029             aparameterinfo2[0] = TypeInfo.createParameterInfo(null, "System.Int32", 0, 0);
3030             addMethodData("GetIntField", null, 454, 0, null, null, aparameterinfo2);
3031             aparameterinfo3 = new ParameterInfo[2];
3032             aparameterinfo3[1] = TypeInfo.createParameterInfo("tc", "VMWDemo.TestClass", 1, 0);
3033             addMethodData("PrintIntField", null, 150, 0, null, null, aparameterinfo3);
3034             addMethodData("Main", "$Main$", 150, 0, null, null, aparameterinfo4 = new ParameterInfo[1]);
3035         }
3036
3037         public void createConstructorData()
3038         {
3039             ParameterInfo aparameterinfo[] = null;
3040             ParameterInfo aparameterinfo1[] = null;
3041             aparameterinfo = new ParameterInfo[2];
3042             aparameterinfo[1] = TypeInfo.createParameterInfo("i", "System.Int32", 1, 0);
3043             addConstructorData(".ctor", 6278, 0, null, null, aparameterinfo);
3044             addConstructorData(".ctor", 6278, 0, null, null, aparameterinfo1 = new ParameterInfo[1]);
3045         }
3046
3047         public void createPropertyData()
3048         {
3049             addPropertyData("IntFieldProperty", "System.Int32", 0, "get_IntFieldProperty", "set_IntFieldProperty",
3050     null, null);
3051         }
3052
3053         public void createEventData() { }
3054
```

```
3055        public void createFieldData()
3056        {
3057           addFieldData("_intField", "System.Int32", 1, null);
3058        }
3059
3060        public void createTypeData()
3061        {
3062           addTypeData("VMWDemo.TestClass", "VMWDemo", 0x100001, null);
3063        }
3064
3065        public static final TestClassAttrib _INSTANCE = new TestClassAttrib();
3066
3067
3068        public TestClassAttrib()
3069        {
3070        }
3071     }
3072
3073     public int get_IntFieldProperty()
3074     {
3075        return _intField;
3076     }
3077
3078     public void set_IntFieldProperty(int i)
3079     {
3080        _intField = i;
3081     }
3082
3083     public TestClass(int i)
3084     {
3085        _intField = i;
3086     }
3087
3088     public TestClass()
3089     {
3090        this(0);
3091     }
3092
3093     public int GetIntField()
3094     {
3095        return _intField;
3096     }
3097
3098     public static void PrintIntField(TestClass testclass)
3099     {
3100        Console.WriteLine$V$Console$I$(testclass.get_IntFieldProperty());
3101     }
3102
3103     public static void $Main$()
3104     {
3105        TestClass testclass = null;
3106        testclass = __CreateClass__0x00000000(3);
3107        PrintIntField(testclass);
3108        testclass.set_IntFieldProperty(9);
3109        PrintIntField(testclass);
3110     }
```

```
3111
3112      public Type _GetType()
3113      {
3114        if(__ThisClass__0x00000000 == null)
3115          __ThisClass__0x00000000 = Class.forName("VMWDemo.TestClass");
3116        return (__ThisClass__0x00000000 != getClass()) ? null : TestClassAttrib._INSTANCE;
3117      }
3118
3119      public static TestClass __CreateClass__0x00000000(int i)
3120      {
3121        return new TestClass(i);
3122      }
3123
3124      public static void main(String args[])
3125      {
3126        AppDomain.createInternalDomain("VMWDemo.exe");
3127        if(__Type__0x00000001 == null)
3128          __Type__0x00000001 = Type.GetTypeFromHandle(Class.forName("VMWDemo.TestClass"));
3129        Environment.setCommandLineArguments(Type.GetTypeFromHandle(__Type__0x00000001), args);
3130        $Main$();
3131        Environment.__Exit__(Environment.get_ExitCode());
3132      }
3133
3134      private static Class __ThisClass__0x00000000;
3135      private int _intField;
3136      private static Type __Type__0x00000001;
3137    }
3138
3139
```

Fig. 2c

```
4000    using System;
4001    using System.Reflection;
4002
4003    namespace VMWDemo
4004    {
4005            /// <summary>
4006            /// Summary description for DemoClass.
4007            /// </summary>
4008            public class DemoClass
4009            {
4010                    public DemoClass()
4011                    {
4012
4013                    }
4014
4015                    [Obsolete("The method is obsolete since version 1.4", true)]
4016                    public void foo()
4017                    {
4018                    }
4019
4020                    /// <summary>
4021                    /// Demo of usage of custom attribute defined on foo method
4022                    /// </summary>
4023                    public static void Main()
4024                    {
4025
4026                            MethodInfo fooMethod = typeof(DemoClass).GetMethod("foo");
4027                            Attribute[] attribs = (Attribute[]) fooMethod.GetCustomAttributes(true);
4028
4029                            Console.WriteLine(((ObsoleteAttribute)attribs[0]).IsError);
4030
4031                    }
4032
4033            }
4034    }
4035
4036
4037
```

Fig. 3a

```
5000    package VMWDemo;
5001
5002    import clr.compiler.*;
5003    import system.*;
5004    import system.Reflection.MemberInfo;
5005    import system.Reflection.ParameterInfo;
5006    import system.Type;
5007
5008    public class DemoClass extends system.Object
5009        implements Cloneable, ITypeableImplementable
5010    {
5011       public static class DemoClassAttrib extends TypeInfo
5012          implements Cloneable
5013       {
5014
5015          public void createMethodData()
5016          {
5017             ParameterInfo aparameterinfo[] = null;
5018             ParameterInfo aparameterinfo1[] = null;
5019             addMethodData("foo", null, 134, 0, "methodAttr_1", null, aparameterinfo = new ParameterInfo[1]);
5020             addMethodData("Main", "$Main$", 150, 0, null, null, aparameterinfo1 = new ParameterInfo[1]);
5021          }
5022
5023          public void createConstructorData()
5024          {
5025             ParameterInfo aparameterinfo[] = null;
5026             addConstructorData(".ctor", 6278, 0, null, null, aparameterinfo = new ParameterInfo[1]);
5027          }
5028
5029          public void createPropertyData()
5030          {
5031          }
5032
5033          public void createEventData()
5034          {
5035          }
5036
5037          public void createFieldData()
5038          {
5039          }
5040
5041          public void createTypeData()
5042          {
5043             addTypeData("VMWDemo.DemoClass", "VMWDemo", 0x100001, null);
5044          }
5045
5046          public Object[] methodAttr_1(Type attribType, boolean isDefined)
5047          {
5048             Object aobj[] = null;
5049             aobj = new Object[1];
5050             if(__Type__0x00000000 == null)
5051                __Type__0x00000000 = Type.GetTypeFromHandle(Class.forName("system.ObsoleteAttribute"));
5052             if(attribType.IsAssignableFrom(Type.GetTypeFromHandle(__Type__0x00000000)))
5053                if(!isDefined)
5054                {
5055                   boolean flag = true;
```

```
5056            String s;
5057            aobj[0] = new ObsoleteAttribute(s = "The method is obsolete since version 1.4", flag);
5058          } else
5059          if(attribType != null)
5060              aobj[0] = Boxer.Box(true);
5061         return aobj;
5062     }
5063
5064     public static final DemoClassAttrib _INSTANCE = new DemoClassAttrib();
5065     private static Type __Type__0x00000000;
5066
5067
5068     public DemoClassAttrib()
5069     {
5070     }
5071 }
5072 public DemoClass()
5073 {
5074 }
5075 public void foo()
5076 {
5077 }
5078 public static void $Main$()
5079 {
5080    system.Reflection.MethodInfo fooMethod = null;
5081    system.Attribute attribs[] = null;
5082    if(__Type__0x00000000 == null)
5083        __Type__0x00000000 = Type.GetTypeFromHandle(Class.forName("VMWDemo.DemoClass"));
5084    fooMethod = Type.GetTypeFromHandle(__Type__0x00000000).GetMethod("foo");
5085    attribs = (system.Attribute[])fooMethod.GetCustomAttributes(true);
5086    Console.WriteLine(((ObsoleteAttribute)attribs[0]).get_IsError());
5087 }
5088 public Type _GetType()
5089 {
5090    if(__ThisClass__0x00000000 == null)
5091        __ThisClass__0x00000000 = Class.forName("VMWDemo.DemoClass");
5092    return (__ThisClass__0x00000000 != getClass()) ? null : DemoClassAttrib._INSTANCE;
5093 }
5094 public static void main(String args[])
5095 {
5096    AppDomain.createInternalDomain("VMWDemo.exe");
5097    if(__Type__0x00000000 == null)
5098        __Type__0x00000000 = Type.GetTypeFromHandle(Class.forName("VMWDemo.DemoClass"));
5099    Environment.setCommandLineArguments(Type.GetTypeFromHandle(__Type__0x00000000), args);
5100    $Main$();
5101    Environment.__Exit__(Environment.get_ExitCode());
5102 }
5103 private static Class __ThisClass__0x00000000;
5104 private static Type __Type__0x00000000;
5105 }
```

Fig. 3b

METHOD AND A SOFTWARE PRODUCT FOR ADAPTING A .NET FRAMEWORK COMPLIANT REFLECTION MECHANISM TO A JAVA ENVIRONMENT

REFERENCES CITED

| Patents | | |
|---|---|---|
| 6,697,062 | Cabral, et al. | Feb. 24, 2004 |
| Published Applications | | |
| 20040139424 | Mourachov | July 2004 |
| 20040230911 | Bent et al. | November 2004 |
| 20040177080 | Doise et al. | September 2004 |
| 20040172627 | Ramani | September 2004 |
| 20040172617 | Ramani et al. | September 2004 |

FIELD OF THE INVENTION

The present invention relates generally to software compilers, and more particularly to a method for adapting a reflection mechanism compliant with the .Net framework to the Java environment.

BACKGROUND OF THE INVENTION

Sun, Sun Microsystems, JVM, Java, are trademarks or registered trademarks of Sun Microsystems, Inc. in the United States and other countries. Microsoft® .NET is a brand associated with Microsoft technology. Microsoft® .NET is software for connecting people, information, systems, and devices. Visual Basic is a registered trademark of Microsoft in the United States and other countries.

The Microsoft® .NET framework is a new platform for building integrated, service-oriented, applications to meet the needs of today's and future Internet businesses. The .Net platform allows developers to take better advantage of technologies than any earlier Microsoft platform. Specifically, the .NET platform provides for code reuse, code specialization, resource management, multi-language development, security, deployment and administration.

A .NET application can be executed on any platform that supports the .NET common language runtime (CLR). The .Net platform allows different programming languages to be integrated with one another. For example, it is possible to create a class in C++ that is derived from a class implemented in Visual Basic. The programming languages supported by the .Net platform include, but are not limited to, C++ with managed extensions, C# (C-Sharp), Visual Basic, Pascal, COBOL, JavaScript and many others. Notably, the source code written in these languages requires the CLR engine in order to execute.

The Java programming environment has recently gained significant popularity. The Java programming language is a language that is designed to be portable enough so that it can be executed on a wide range of computers, ranging from small devices, such as a personal digital assistant (PDA), cell phone, and smart cards, all the way to high-end supercomputers. Computer programs written in the Java programming language are compiled into Java bytecode instructions that are suitable for execution by a Java virtual machine (JVM).

Applications designed with the .Net platform cannot execute on a JVM. As a result, developers cannot integrate the advantages inherent to .Net with the capabilities provided by the Java runtime environments. To overcome this limitation, compilers that enable the execution of .Net applications on JVM have been introduced. These compilers (hereinafter the "IL2J compilers") decode Microsoft intermediate language (MSIL) instructions and produce Java bytecodes instructions. An example of such a compiler is disclosed in U.S. patent application Ser. No. 10/437,518 entitled "Compiler and Software Product for Compiling Intermediate Language Bytecodes into Java Bytecodes," assigned to common assignee and incorporated herein by reference for all that it contains.

Besides the need to compile MSIL instructions into Java bytecodes, there is also a necessity to compile other software mechanisms introduced by the .Net platform, to allow a full adaptation to Java. One of these mechanisms is the reflection, used to discover class information solely at runtime. Specifically, the reflection allows invoking data members at runtime, determining the class of an object, finding what constants and method declarations belong to an interface, creating an instance of a class whose name is not known until runtime, and retrieving as well as setting a value of a data member, even if the data member name is unknown until runtime.

There are many differences between the reflection mechanisms, or application programming interfaces (API's), provided by the Java and .Net frameworks. These differences are mainly related to handling semantic gaps between the programming languages supported by the .Net and the Java programming language and to the fact that attributes in a Java framework are only a subset of those defined in the .Net framework. Furthermore, the two frameworks use different API's to invoke data members at runtime.

It would be therefore advantageous to provide a method and software product capable of adapting the reflection mechanism as defined in the .Net framework to the Java environment.

SUMMARY OF THE INVENTION

Accordingly, it is a principal object of the present invention to provide a method and software product capable of adapting a reflection mechanism as defined in the .Net framework to the Java environment.

It is another object of the present invention to provide a plurality of conversion methods for use with a reflection mechanism as defined in the .Net framework to the Java environment.

It is a further object of the present invention to provide means for generating an attributes class for inclusion in a Java class file rendered by a compiler capable of compiling a .Net class to a Java compliant programming code.

A method is disclosed for adapting a .Net framework compliant reflection mechanism to a Java environment, wherein the reflection mechanism allows a user to discover class information and invoke data members solely at runtime. The method includes gathering reflection related metadata from a .Net assembly class of a respective .Net class that comprises the metadata. The method also includes the steps of generating an attributes class comprising at least the reflection related metadata and a plurality of conversion methods and integrating the attributes class in a Java class file of the respective .Net class, such that the reflection mechanism is capable of adapting the reflection mechanism as defined in the .Net framework to the Java environment. Also disclosed is a plurality of conversion methods. The attributes class is included in a Java class file rendered by a compiler capable of compiling a .Net class to a Java compliant programming code.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 2A is the software coding for a non-limiting example of a .Net class that includes reflection definitions that can be handled by the reflection analyzer of the present invention;

FIG. 2B is the software coding for a non-limiting example of an attributes class file generated by the reflection analyzer of the present invention;

FIG. 2C is the software coding for a non-limiting example of a Java class file generated in accordance with the present invention;

FIG. 3A is the software coding for a .Net class that includes definition of a custom attribute, wherein the .Net class can be handled by the reflection analyzer of the present invention;

FIG. 3B is the software coding for a non-limiting example of a Java class file that includes a custom attribute definition and generated in accordance with the present invention.

DETAILED DESCRIPTION OF THE INVENTION

The principles and operation of a method and a software product according to the present invention may be better understood with reference to the drawings and the accompanying description, it being understood that these drawings are given for illustrative purposes only and are not meant to be limiting.

Hereinafter there is disclosed a method for adapting a reflection mechanism, compliant with the .Net framework, to the Java environment. The method includes gathering reflection related metadata, and thereafter generating an attributes class that comprises the metadata. In addition there are disclosed a plurality of conversion methods. The attributes class is included in a Java class file rendered by a compiler capable of compiling a .Net class to a Java compliant programming code.

Figure 1:
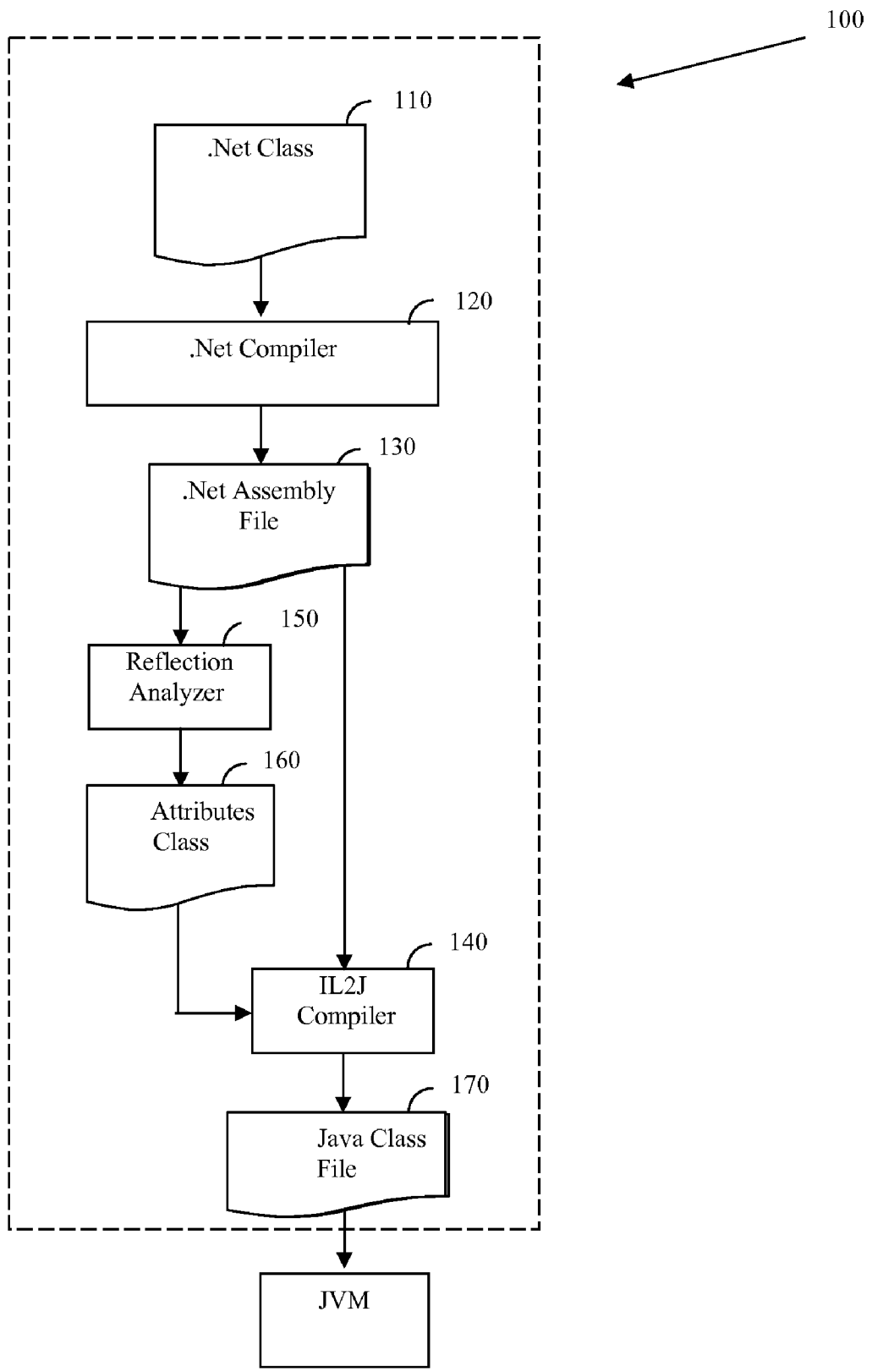
FIG. 1 is an illustration of a non-limiting process flow for adapting a reflection mechanism in accordance with an exemplary embodiment of the present invention.

Reference is now made to FIG. 1, which is an illustration of a non-limiting process flow 100 for adapting a reflection mechanism, in accordance with an exemplary embodiment of the present invention. Reflection is a mechanism that allows a user to discover class information and invoke data members solely at runtime. Reflection functions are part of the reflection namespace defined in the .Net framework. For example, a list of data members for a given data type can be retrieved using a group of "Info" objects, each representing a different set of members. For instance, the "MethodInfo" object represents information about a method. As another example, the developer can further include reflection functions for retrieving information on a type declaration, such as constructors, properties, methods and events. For that purpose the reflection namespace comprises a set of "GetTypes" functions, e.g., GetConstructors( ), GetProperties( ), GetMethods( ), GetEvents( ) and others. To invoke data members the developer creates an instance of a class including the data member to be invoked.

Initially, a software developer creates a .Net class 110 that comprises a source code written in any programming language supported by the .Net platform. The programming languages supported by the .Net platform may be, but are not limited to, C++ with managed extensions, C# (C-Sharp), Visual Basic, Pascal, COBOL, JavaScript and many others. The .Net Class 110 may include at least a reflection function (or definition) of the type of information desired to be retrieved, viewed, set and/or invoked at runtime.

FIG. 2A shows the software coding for an exemplary .Net class, written in C# and named "TestClass." TestClass includes several definitions of data members, such a field (line 1007), a property (lines 1009-1019), constructors (lines 1022-1029) and methods (lines 1031-1048).

Referring again to FIG. 1, Net class 110 is compiled into a .Net assembly file 130 using a .Net compiler 120. .Net compiler 120 consists of several compilers, each targeted to a different programming language supported by the .Net platform. Assembly file 130 includes at least MSIL instructions, which are provided as an input to an intermediate language to Java (IL2J) compiler 140 and a reflection analyzer 150. IL2J compiler 140 compiles the MSIL instructions into Java bytecodes and outputs Java class files that can be executed over any Java runtime environment, e.g., the Java Virtual Machine (JVM). A detailed example for the operation of IL2J compiler 140 is found in U.S. patent application Ser. No. 10/437,518 referenced above. In an alternative embodiment of the present invention, reflection analyzer 150 may be part of IL2J compiler 140.

Reflection analyzer 150 enables the utilization of the .Net reflection mechanism in the Java environment. Specifically, reflection analyzer 150 analyzes each class and method defined in .Net assembly file 130 and gathers reflection related information that may be used during runtime. This information includes parameter names, parameter types, modifiers, custom attributes, flags and any other data relevant to data members. Data members may be fields, constructers, methods, properties or events defined in .Net class 110. In addition, reflection analyzer 150 generates conversion methods enabling the use by the Java environment of each reflection function in .Net class 110. Specifically, these methods allow getting, setting and invoking data members when the resultant Java class is executed over the Java runtime environment. The conversion methods and the metadata, i.e., the gathered information, are saved in an attributes class 160 produced by reflection analyzer 150. Attributes class 160 is a Java class file 170 that extends the Java file "TypeInfo," for which the software coding is listed in FIG. 2B FIG. 2B shows the software coding for a non-limiting and exemplary attributes class 160 produced by reflection analyzer 150, and is related to the .Net class shown in FIG. 2A. The TypeInfo file contains at least one abstract method that attributes classes generated by reflection analyzer 150 can inherit. The attributes class provided in FIG. 2B includes a set of conversion methods called "Create Methods," each of which is associated with a single type of data member. The Create Methods convert the .Net reflection related information to a Java compliant format. For example, an implementation of the conversion method, createMethodData( ), is shown in lines 2003-2023. This method uses the "addMethodData" function defined in TypeInfo, and is listed below, followed by a detailed explanation of the addMethodData function. This function gets seven arguments as follows:

```
addMethodData(String methodName,
               String mangledName,
               int flags,
               int attributes,
               String customAttribMethod,
               String returnAttribMethod,
               ParameterInfo[ ] parameters){
    String javaMethodName = (mangledName == null) ? methodName :
mangledName;
        Class[ ] javaParams = getJavaParameterClasses(parameters);
        try
        {
            Method m =_clazz.getDeclaredMethod(javaMethodName,
            javaParams);
            MethodInfo mi = new MethodInfo(m, _clazz,
            methodName, flags,
attributes,
                    parameters, customAttribMethod,
                    returnAttribMethod);
            mi.setOrderNum(_methodOrder++);
            _methods.add(mi);
        }
        catch(Exception e)
        {
            System.out.println("Cannot find method " +
            javaMethodName + " in class
" + _reflectedClassName);
                e.printStackTrace( );
        }
    }
```

The first argument, "methodName," is the name of the method as defined in .Net class 110. The second argument, "mangledName," is the method name in a resultant Java class file 170. If the method's name has not been modified, this argument receives a null value. The third argument, "flags," is an integer value that represents the flags assigned for the method. The fourth argument, "attributes," contains general attributes defined for that method. Attributes are descriptive declarations that allow annotation of data members. Attributes can be extracted using runtime reflection services. The fifth argument, "customAttribMethod," includes user-defined attributes for that method. Handling custom attributes is exemplified in one embodiment of the present invention and will be described in greater detailed below. The sixth argument includes attributes that are attached to return types. The seventh argument is a parameter array that includes the representation of the method's parameters and its return value. For each return value or parameter, an element in the parameter array holds its .Net specific modifiers, name, custom attributes and so on. The values of the flags, attributes, customs attributes and parameters are set according to the content of the metadata gathered by reflection analyzer 150. For example, in line 2018, the method "GetIntField" defined in the TestClass (line 1031-1034) is handled. The addMethodData function is called with the following values:

addMethodData ("GetIntField", null, 454, 0, null, null, aparameterinfo2)

The mangledName has a null value, since the method name was not modified when converted to Java. The "aparameterinfo2" is an array that holds only one component which is the return value of the "GetIntField" method. The array is set in line 2017, with a 32-bit integer, which is the type of the return value of the "GetIntField" method.

As depicted in FIG. 2B the "TestClassArrtib" class includes other types of create methods used for converting field data (see lines 2041-2044), property data (lines 2035-2039), constructors data (lines 2025-2033) and events data (line 2040). The createEventData( ) method is an empty method, as no events were defined in the .Net class "TestClass" shown in FIG. 2A.

Attributes class 160 is combined with Java class file 170 generated by IL2J compiler 140. Namely, Java class file 170 includes the Java bytecodes and the attributes class. The production of Java class file 170 includes generating a single Java class for each MSIL class in assembly file 130, mapping methods as well as variable names.

FIG. 2C shows the software coding for a non-limiting and exemplary de-compiled Java class file 170. As can be noted lines 3011-3071 are the nested attributes class described in greater detail above. Lines 3073-3137 include Java code lines of methods, constructors, and properties defined in the TestClass shown in FIG. 2A. As the Java programming language does not explicitly support the Property function, as defined in the .Net framework, the Property function (lines 1009-1019 of FIG. 2A) is implemented using two methods "get_IntFieldProperty" and "set_IntFieldProperty" (see lines 3073-3081 of FIG. 2C). The prefixes "set_" and "get_" are used for converting Property functions. The same problem is faced with Event functions, and the prefixes used in this case are "add_" and "remove_."

When retrieving information related to data members there is also a need to support semantic differences between the programming languages supported by the .Net platform and the Java programming language. For example, conversion of .Net proprietary variable and data structure types (e.g., Enum) to Java variable types is required. Specifically, when invoking a data member, this data member is first converted to a format compliant with the Java programming language, invoked and then converted back to a format compliant with one of the .Net programming languages.

In one exemplary embodiment, the present invention is capable of handling custom attributes. Custom attributes are user-defined attributes that provide additional information about data members. For example, a custom security attribute that specifies the permissions required by a caller function to execute a procedure. In the .Net framework, custom attributes are defined in attribute classes based on the System.Attribute class.

FIG. 3A shows the software coding to provide a .Net class that includes, in line 4015, a custom attribute definition "ObsoleteAttrubute." This attribute is defined for the method "foo."

In the earliest version of the Java development environment a program element similar to the custom attributes does not exist. In order to allow the full adaptation of .Net framework to Java environment, the present invention enables the retrieval of custom attributes when executing the Java code. With that aim, reflection analyzer 150 creates a special conversion method "custom attribute handler," that manages the retrieval of the custom attributes. In addition, reflection analyzer 150 passes to "Info" objects (e.g., MethodInfo, TypeInfo, FieldInfo and others) the name of the custom attribute handler.

FIG. 3B shows the software coding for an exemplary Java class that includes the attributes class and related to FIG. 3A. The conversion method createDataMethod( ), in lines 5015-5027, handles methods defined in the .Net class (e.g., "main" and "foo"). As shown in line 5019, the call to the addMethodData function includes in the fifth argument the parameter "methodAttr_1." This parameter is the name of the custom attribute handler. The implementation of the custom attribute handler "methodAttr_1" is provided in lines 5046-5062. The array "aobj" holds the custom attribute "ObsoleteAttribute" defined for the method "foo."

At runtime, when a user invokes GetCustomAttribute( ) method, the attributes are retrieved through the "foo" method, as illustrated in the following exemplary code:

Type t=foo;
MethodInfo m=t. GetMethod("foo");
A[ ] CustomAttribs=m. GetCustomAttribute( );

The array A holds the custom attributes "ObsoleteAttribute" defined for the method "foo."

Additionally, during run-time, the user may request to instantiate one of the "Info" objects. In that case the name of the custom attributes handler (e.g., methodAttr_1) is passed to the "Info" object's constructor.

Figure 4:
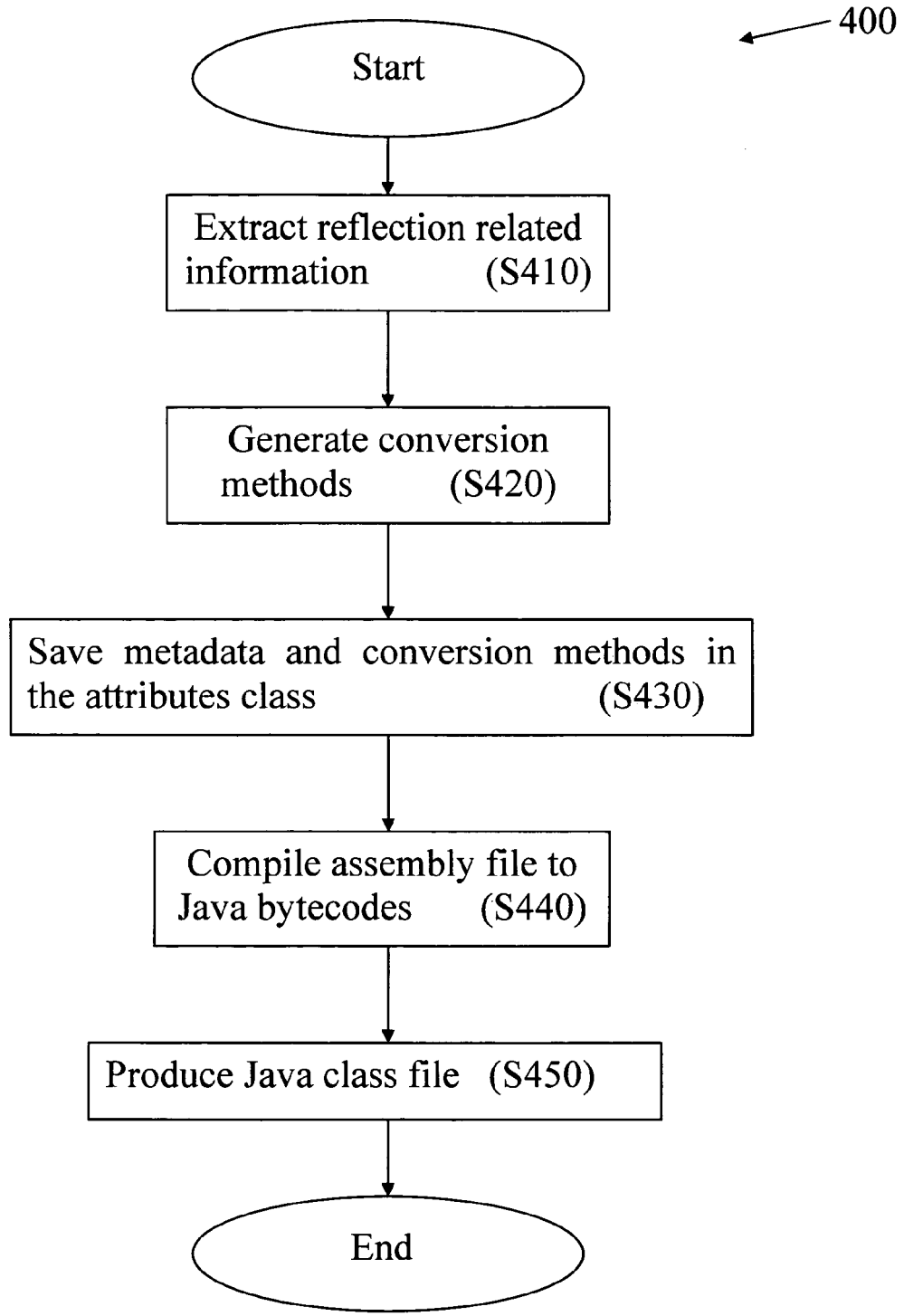
FIG. 4 is a non-limiting and exemplary flowchart describing the operation of the present invention.

FIG. 4 is a non-limiting and exemplary flowchart 400, describing the overall operation of the present invention. The reflection analyzer receives as its input an assembly file created by a .Net compiler. At step S410, the received assembly file is scanned for the purpose of extracting reflection-related information included in the file. Namely, information associated with data members defined in the .Net class (e.g., .Net class 110) is gathered. At step S420, one or more conversion methods are generated to handle reflection functions defined in the .Net class. Examples of the conversion methods are the createMethodData( ) and methodAttr_1( ) described in greater detail above. At step S430, the conversion methods, together with the extracted information (i.e., metadata), are saved in an attributes class (e.g., attributes class 160 shown in FIG. 1). At step S440, the assembly files are compiled into a Java class, i.e., to Java bytecodes by means of the IL2J compiler. At step S450, the generated attributes class and the Java class, respectively produced by the reflection analyzer and IL2J, are merged into a single Java file that can be executed over any Java runtime environment.

It is to be understood that the phraseology and terminology employed herein are for the purpose of description, and should not be regarded as limiting.

It is important, therefore, that the scope of the invention is not construed as being limited by the illustrative embodiments set forth herein. Other variations are possible within the scope of the present invention as defined in the appended claims and their equivalents.

We claim:

1. A method for adapting a .Net framework compliant reflection mechanism to a Java runtime environment, wherein said reflection mechanism discovering class information and invoking data members solely at runtime, said method comprising:
    gathering reflection related metadata from a .Net assembly class of a respective .Net class;
    generating a plurality of conversion methods, wherein each of the conversion methods enables the use of at least a reflection function defined in said .Net class by said Java run, time environment;
    generating an attributes class comprising at least said reflection related metadata and said plurality of conversion methods; and
    integrating said attributes class in a Java class file of said respective .Net class,
    such that said reflection mechanism is adapted as defined in the .Net framework to the Java environment;
    wherein the reflection functions are for retrieving information on a type data declaration; for creating an instance of a class and for invoking a data member of a class.

2. The method of claim 1, wherein said reflection related metadata comprises at least one of: a parameter name; a parameter type; a modifier; a custom attribute; and flags of at least one data member defined in said .Net class.

3. The method of claim 2, wherein said data member is at least one of: a nested type; a field, a constructer; a method; a property; and an event.

4. The method of claim 1, wherein said reflection function is at least one of: get a data member; invoke a data member; and set a data member.

5. The method of claim 1, wherein each of said plurality of conversion methods comprises a create method, wherein said create method is capable of converting said reflection related metadata from .Net compliant format to a Java compliant format.

6. The method of claim 1, wherein each of said plurality of conversion methods comprises a custom attribute handler, wherein said custom attribute handler is capable of enabling the use of custom attributes defined in said .Net class of said Java environment.

7. The method of claim 1, wherein said .Net class comprises a programming code written in at least one of the following programming languages: C++ with managed extensions; C-Sharp (C#); Visual Basic; Pascal; COBOL; Java-Sharp (J#); and Jscript.

8. The method of claim 7, wherein said assembly .Net class is generated by a .Net compiler.

9. The method of claim 1, wherein said Java class file is generated by a compiler capable of compiling said .Net class to a Java compliant programming code.

10. The method of claim 1, wherein said attributes class is a Java class.

11. The method of claim 1, wherein said attributes class inherits a TypeInfo class.

12. The method of claim 11, wherein said TypeInfo class comprises implementation of said plurality of conversion methods.

13. A computer software product, comprising computer-readable media with instructions to enable a computer to implement a process for adapting a .Net framework compliant reflection mechanism to a Java runtime environment, wherein said reflection mechanism for discovering class information and for invoking data members solely at runtime, said process comprising:
    gathering reflection related metadata from a .Net assembly class of a respective .Net class that is configured to comprise said metadata;
    generating a plurality of conversion methods, wherein each of the conversion methods enables the use of at least a reflection function defined in said .Net class by said Java runtime environment;
    generating an attributes class comprising at least said reflection related metadata and said plurality of conversion methods; and
    integrating said attributes class in a Java class file of said respective .Net class,
    such that said reflection mechanism is adapted as defined in the .Net framework to the Java environment;
    wherein reflection functions are for retrieving information on a type data declaration; for creating an instance of a class and for invoking a data member of a class.

14. The computer software product of claim 13, wherein said reflection related metadata comprises at least one of: a parameter name; a parameter type; a modifier; a custom attribute; and flags of at least one data member defined in said .Net class.

15. The computer software product of claim 14, wherein said data member is at least one of: a nested type; a field; a constructer; a method; a property; and an event.

16. The computer software product of claim 13, wherein said at least one reflection function is at least one of: get a data member; invoke a data member; and set a data member.

17. The computer software product of claim 13, wherein each of said plurality of conversion methods comprises a create method, wherein said create method is being capable of converting said reflection related metadata from .Net compliant format to a Java compliant format.

18. The computer software product of claim 13, wherein each of said plurality of conversion methods comprises a custom attribute handler, wherein said custom attribute handler is being capable of enabling the use of custom attributes defined in said .Net class in said Java environment.

19. The computer software product of claim 13, wherein said .Net class comprises a programming code writing in at least one of the following programming languages: C++ with managed extensions, C-Sharp (C#), Visual Basic, Pascal, COBOL, Java-Sharp (J#), Jscript.

20. The computer software product of claim 19, wherein said assembly .Net class is generated by a .Net compiler.

21. The computer software product of claim 13, wherein said Java class file is generated by a compiler capable of compiling said .Net class to a Java compliant programming code.

22. The computer software product of claim 13, wherein said attributes class is a Java class.

23. The computer software product of claim 13, wherein said attributes class inherits a TypeInfo class.

24. The computer software product of claim 23, wherein said TypeInfo class comprises implementation of said plurality of conversion methods.

* * * * *